United States Patent
Oukid et al.

(10) Patent No.: US 10,152,258 B1
(45) Date of Patent: Dec. 11, 2018

(54) BIG BLOCK ALLOCATION OF PERSISTENT MAIN MEMORY

(71) Applicant: SAP SE, Walldorf (DE)

(72) Inventors: Ismail Oukid, Leimen (DE); Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 15/621,640

(22) Filed: Jun. 13, 2017

(51) Int. Cl.
*G06F 3/06* (2006.01)

(52) U.S. Cl.
CPC ........... *G06F 3/0626* (2013.01); *G06F 3/068* (2013.01); *G06F 3/0631* (2013.01)

(58) Field of Classification Search
None
See application file for complete search history.

(56) References Cited

U.S. PATENT DOCUMENTS

| | | | | |
|---|---|---|---|---|
| 7,058,785 B1 * | 6/2006 | Ochotta | ................ | G06F 12/023 711/202 |
| 8,793,290 B1 * | 7/2014 | Pruthi | ................... | G06F 3/0604 707/821 |
| 2002/0144073 A1 * | 10/2002 | Trainin | ................. | G06F 12/023 711/170 |
| 2009/0198952 A1 * | 8/2009 | Khmelnitsky | ...... | G06F 12/0246 711/206 |
| 2015/0169226 A1 * | 6/2015 | Shen | .................... | G06F 12/0238 711/103 |
| 2016/0342399 A1 * | 11/2016 | Gopalakrishnan | ...... | G06F 8/423 |
| 2016/0371162 A1 * | 12/2016 | Booss | ................. | G06F 11/2094 |
| 2018/0046556 A1 * | 2/2018 | Marathe | ................ | G06F 3/0604 |

* cited by examiner

*Primary Examiner* — Kevin Verbrugge (74) *Attorney, Agent, or Firm* — Sterne, Kessler, Goldstein & Fox P.L.L.C.

(57) ABSTRACT

Disclosed herein are system, method, and computer program product embodiments for of big block allocation of persistent main memory. An embodiment operates by receiving an allocation request for memory of a requested size. A free memory block, that exceeds the requested size by a remainder and is available for allocation, is determined. A size of the free memory block is updated to indicate that the size of the free memory block is equal to the remainder size. A new block of the requested size is inserted with an indication that the new block is allocated. A memory address corresponding to the new block is returned.

20 Claims, 4 Drawing Sheets

BIG BLOCK ALLOCATION OF PERSISTENT MAIN MEMORY

CROSS REFERENCE TO RELATED APPLICATIONS

This application is related to co-pending U.S. patent application Ser. No. 15/621,736, by Oukid, et al., "Defragmentation of Persistent Main Memory," filed herewith which is hereby incorporated by reference in its entirety.

BACKGROUND

Storage class memory (SCM) combines the low latency and byte-addressability of dynamic read access memory (DRAM) with the non-volatility, areal density, and economical characteristics of traditional storage media. Furthermore, given the byte-addressability and low latency of SCM technologies, central processing units (CPU) can access data stored in SCM without buffering the data in DRAM. Consequently, SCM technologies blur the distinction between computer memory and traditional storage media, and enable single level architectures without DRAM. Unlike traditional main memory and disk storage configurations, SCM provides a single level architecture. What is needed however is a system that manages the allocation of SCM in a single level architecture.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for big block allocation of persistent main memory.

Figure 1:
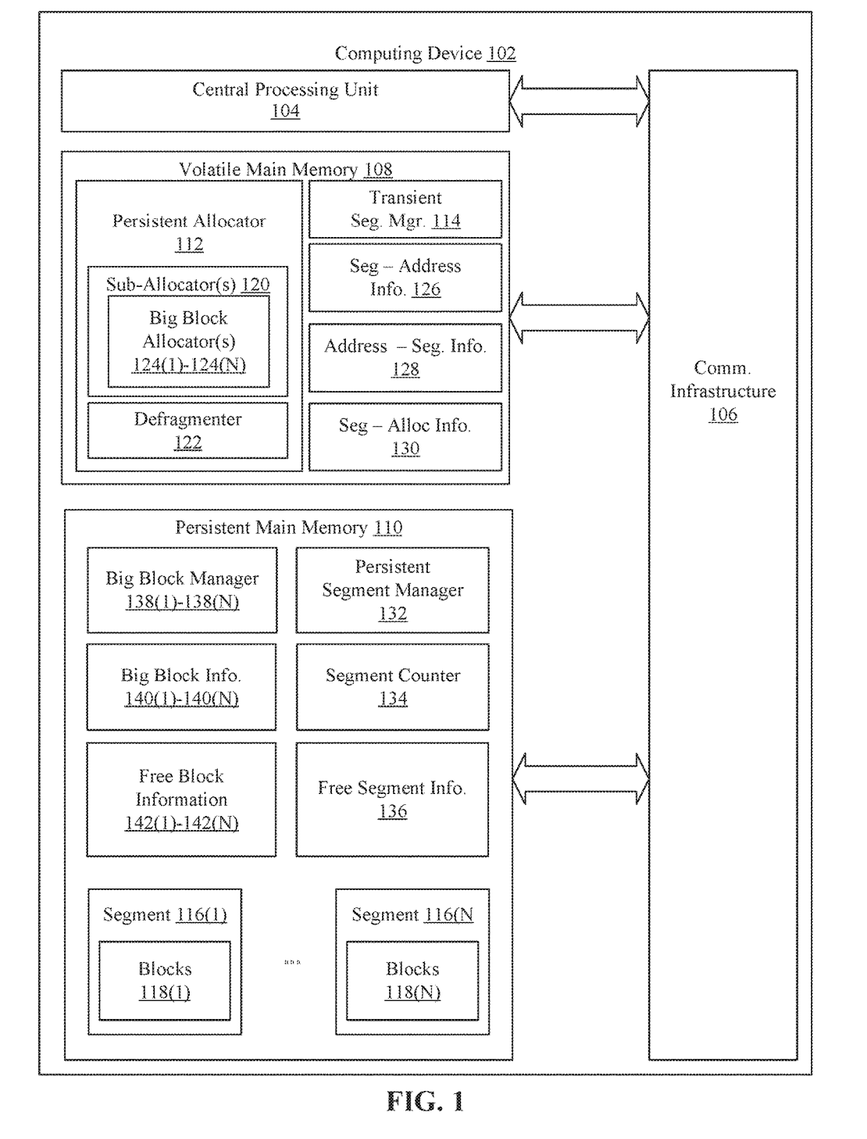
FIG. 1 illustrates select components of an exemplary computing system of big block allocation of persistent main memory, according to some embodiments.

FIG. 1 illustrates select components of an exemplary computing system 100 of big block allocation of persistent main memory, according to some embodiments. FIG. 1 illustrates select components of an exemplary computing device 102 in which the embodiments described herein can be implemented. Some examples of computing device 102 include computer servers, smart phones and mobile communication devices; tablet computing devices; desktops, laptops, netbooks and other portable computers, or other similar devices capable of accessing a data storage system for data read and data write operations. In some examples, computing device 102 may be used to execute one or more processes associated with a database management application.

As shown in FIG. 1, computing device 102 includes a central processing unit (CPU) 104, a communication infrastructure 106 (e.g., a system bus), volatile main memory 108 (e.g., dynamic random access memory (DRAM)), and persistent main memory 110 (i.e., SCM). Some examples of persistent main memory may include phase change memory, spin transfer torque random access memory, magnetic random access memory, and memristors. FIG. 1 further illustrates that CPU 104, volatile main memory 108, and persistent main memory 110 are connected via a communication infrastructure or interface 106.

In an embodiment, volatile main memory 108 may include a persistent allocator 112 and a transient segment manager 114. Persistent allocator 112 is a memory allocator that manages memory regions of persistent main memory 110. For example, persistent allocator 112 may request (from transient segment manager 114) and memory map segments (i.e., files) on persistent main memory 110 on an as-needed basis. As illustrated in FIG. 1, persistent main memory 110 includes a plurality of segments 116 that may be created and memory mapped by persistent allocator 112. Further, individual segments are comprised of a plurality of blocks 118 that may be allocated by the persistent allocator 112 to processes executing on CPU 104. In some instances, the persistent main memory 110 may be managed by a file system optimized for byte-addressable non-volatile memory.

Processes executing on CPU 104 can access (i.e., read and write) data stored on volatile main memory 108 and persistent main memory 110 via pointers. For example, once a process is allocated a block of the plurality of blocks 118, a file system may provide the process direct access to the block via memory mapping and a pointer associated with the block. In an embodiment, a process may have an associated address space that includes a set of virtual memory addresses that it can use during execution. Further, a virtual memory address does not represent the actual physical location of data in volatile main memory 108 or persistent main memory 110. Instead, the computing system or computing device 102 relies on internal data structures to translate virtual addresses into their corresponding physical addresses on volatile main memory 108 or persistent main memory 110. Accordingly, each time a process references a virtual address, computing device 102 may translate the virtual address to a physical address.

Typically, when a process restarts or fails, virtual pointers previously associated with the process are rendered invalid because the process is provided a new virtual address space. As such, virtual pointers cannot reliably be used with a persistent main memory because they cannot be used to recover persistent data structures. To solve this problem, an exemplary embodiment utilizes persistent pointers to reference persistent data structures, such as the plurality of blocks 118. In some examples, the persistent pointers consist of an 8-byte segment identifier and an 8-byte offset indicating the location of the block within the segment corresponding to the segment identifier. In some examples, persistent pointers may be used for allocation and deallocation of memory, while virtual pointers are used to read and write access of the allocated memory.

In an embodiment, persistent allocator 112 may include a plurality of sub-allocators 120, and a defragmenter 122 that reduces fragmentation of the plurality of segments 116 of persistent main memory 110 (or portions thereof). Operations related to defragmenter 122 are described in greater detail in co-pending patent application titled "Defragmentation of Persistent Main Memory," which is hereby incorporated in its entirety. In an exemplary embodiment, individual sub-allocators 120 may receive and attempt to fulfill allocation requests from the processes (e.g., of CPU 104) via persistent allocator 112. Fulfillment of an allocation request may include providing the requesting process a persistent pointer to a block of the plurality of blocks 118, the block having a size equal to or greater than a block size indicated in the request.

In some embodiments, the individual sub-allocators 120 may have a designated block size range. For example, the plurality of sub-allocators 120 may include one or more big block allocators 124 that perform allocations ranging from 16 KB to 16 MB. The plurality of sub-allocators 120 may also include one or more small block allocators that perform allocations ranging from 64 B to 16 KB, and a huge block allocator that performs allocations larger than 16 MB. Further, individual sub-allocators may implement different algorithms for allocating blocks to processes. For example, a big block allocator 124(1) may be a tree-based allocator that applies a best-fit algorithm for block allocation. As another example, the small block allocators may apply a segregated-fit algorithm. In an embodiment, persistent allocator 112 may maintain one big block allocator 124 per CPU core and one small block allocator per CPU core in order to provide concurrent operation.

Additionally, transient segment manager 114 maintains segment information corresponding to the plurality of segments 116 of the persistent main memory 110. For example, transient segment manager 114 maintains segment to virtual address information, virtual address to segment information 128, and segment to allocator information 130. The segment to virtual address information 126 maps segment identifiers to virtual addresses. In some cases, the segment to virtual address information 126 may be used to convert a persistent pointer to its corresponding virtual address. The virtual address to segment information 128 maps virtual addresses to their corresponding segment identifiers and size. In some cases, the virtual address to segment information 128 may be used to convert a virtual address to its corresponding persistent pointer. The segment to allocator information 130 maps a segment identifier to a sub-allocator identifier.

In some examples, the individual segments 116 are not shared between the plurality of sub-allocators 120. For example, persistent allocator 112 may create a segment 116(1), and assign the segment 116(1) to a particular sub-allocator 120(1). Accordingly, the segment to allocator information 130 indicates that the segment 116(1) is assigned to a particular allocator 120(1). Once a segment 116(1) is assigned to a sub-allocator 120(1), the sub-allocator 120(1) is permitted to allocate blocks 118 from the segment. Further, the sub-allocator 120(1) is responsible for deallocating blocks 118(1) associated with or from the segment 116(1). The allocation and deallocation of blocks by big block allocator 124 is described in further detail below.

In an embodiment, persistent main memory 110 includes a persistent segment manager 132. Persistent segment manager 132 may maintain a global segment counter 134, and free segment information 136. Global segment counter 134 may maintain a count of the current number of the plurality of segments 116. Free segment information 136 may identify the segments of the plurality of segments 116 that are not currently assigned to one of the plurality of sub-allocators 120. Further, the segments of the plurality of segments 116 identified in free segment information 136 can be provided to one of the plurality of sub-allocators 120 upon request.

In an embodiment, big block allocator 124(1) may receive a request for a block of a particular size. Big block allocator 124(1) may determine that none of its segments include a block equal to or greater than the requested size. As a result, the big block allocator 124(1) may fetch or request a segment from the free segment information 136. Upon an assignment or allocation of the segment to big block allocator 124(1), persistent allocator 112 may update free segment information 136 and segment to allocator information 130 to reflect ownership of the segment by the big block allocator 124(1).

As shown in FIG. 1, persistent main memory 110 may include big block managers 138. In an embodiment, individual big block managers 138 may be associated with particular big block allocators 124. For example, a first big block manager 138(1) is associated with a first big block allocator 124(1), an Nth big block manager 138(N) is associated with an Nth big block allocator 124(N), and so forth. Further, each big block manager 138 maintains big block information 140 that includes a topology representing the blocks associated with its corresponding big block allocator 124, and free block information 142 identifying the free blocks associated with its corresponding big block allocator 124. For example, first big block manager 138(1) maintains first big block information 140(1) and first free block information 142(1), an Nth big block manager 138(N) maintains Nth big block information 140(N) and Nth free block information 142(N), and so forth In some instances, big block manager 138(1) may maintain free block information 142(1) as a tree data structure representing the free blocks associated with big block allocator 124(1). Further, individual nodes of the tree may include a persistent pointer to a block and the size of the block. In an embodiment, big block manager 138(1) may maintain big block information 140(1) as a tree data structure that stores pertinent information (e.g., as metadata) about the blocks associated with its corresponding big block allocator 124(1). Individual nodes of a tree (big block info 140 and/or free block info 142) may map the persistent pointer of a block to block attributes describing the block. In some instances, the block attributes are eight bytes long, and include the size of the block. Example attributes include, but are not limited to, an "isUsed" attribute indicating whether the block is currently allocated, an "isLastBlock" attribute indicating whether a block is at the end of a segment, and an "isHole" attribute indicating whether a block is a hole. As described herein, a hole includes unused storage capacity of a segment that resides amongst currently allocated blocks.

Figure 2:
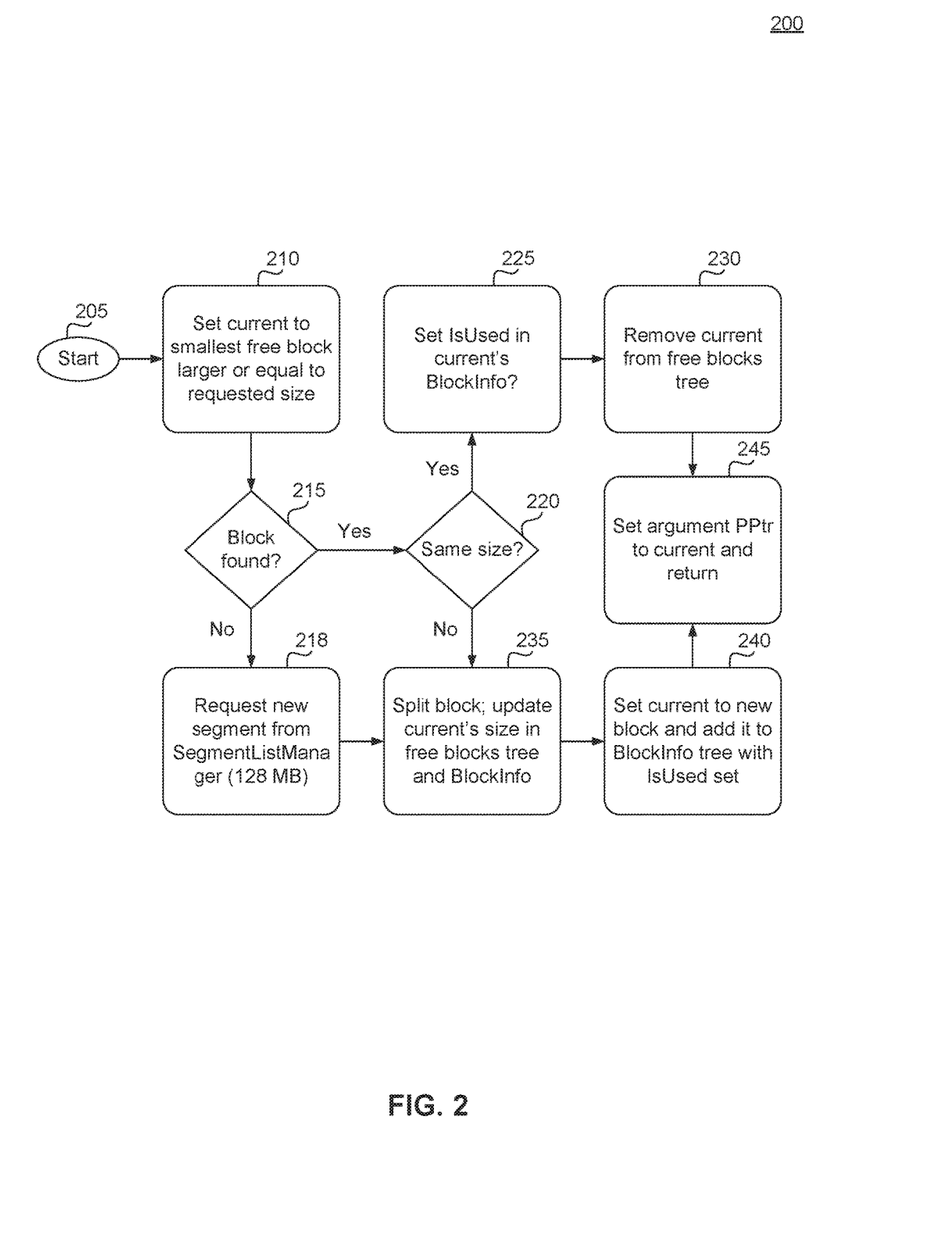
FIG. 2 is a flowchart illustrating a process for big block allocation of persistent main memory, according to some example embodiments.

FIG. 2 is a flowchart illustrating a process 200 for big block allocation of persistent main memory, according to some example embodiments. Process 200 can be performed by processing logic that can comprise hardware (e.g., circuitry, dedicated logic, programmable logic, microcode, etc.), software (e.g., instructions run on a processing device), or a combination thereof At start 205, a process, application, or program operating on CPU 104 may request memory allocation of a particular size. Persistent allocator 112 may determine the request is to be processed or handled by big block allocator 124 (e.g., based on the request size falling within a range of request sizes handled by big block allocator 124). As described above, big block allocator 124 may process requests that fall between the lower and upper request bounds. In an embodiment, these bounds for big block allocator 124 may be requests of 16 kilobytes to 16 megabytes. Requests outside of that range may be handled by various other sub-allocators 120 (such as a small allocator for requests below 16 kilobytes, and a huge allocator for requests greater than 16 megabytes). The operations described with respect to FIG. 2 are operations performed by big block allocator 124.

At 210, big block allocator 124 may determine whether or not there is an existing free memory block 118 that is the same size or larger than the requested allocation size. As described above, big block manager 138 may maintain a topology of both free block information 142 and big block information 140. Free block information 142 may track or maintain metadata of which blocks 118 (in segments assigned to big block allocator 124) are free for allocation. In an embodiment, free block information 142 may include address and size information about the respective blocks 118.

Big block information 140 may track or maintain information about all the blocks being managed by a particular big block manager 138 or big block allocator 124, including both free and allocated blocks. In an embodiment, big block information 140 may include address and size information or metadata about the blocks 118, as well as an indication as to whether or not the respective block 118 is being used or is allocated. For example, big block information 140 may include an 'isUsed' flag that indicates whether a block is allocated. For example, when set to true or 1, the isUsed flag may indicate the block has been allocated, when set to false or 0, the isUsed flag ma indicate that the block is free to be allocated. In an embodiment, free or unallocated blocks 118 may be included or tracked in both big block information 140 and free block information 142.

At 215, big block allocator 124 or big block manager 138 may check free block information 142 to determine whether or not there is a free block of sufficient size to fulfill the request. If there are multiple free blocks greater than or equal to the requested size, then in an embodiment, the smallest sized block that is greater than or equal to the request size may be selected.

If a block of sufficient size is found, at 220, the size of the free block is compared to the request size. If there is a match, and the free block size is equal to the requested block size, then at 225 the 'isUsed' flag corresponding to the block is set in the big block information 140 index, indicating that the previously free block is now allocated. At 230, the corresponding block is removed from free block information 142.

At 245, an address of the newly allocated block is returned as a persistent pointer for access by the requesting program or process of CPU 104. In an embodiment, a requesting program or process may provide or indicate a data structure into which the address of the allocated memory block is written. Then, for example, big block allocator 124 may write the address into the provided data structure indicated by the program. The program will then have this address available through restarts and program crashes.

If, at 220 the size of the free block is found to be larger than the requested block size, then at 235 the free block may be split into two blocks. To split the free block, big block manager 138 may first determine by how much the size of the free block exceeds the requested size, this is called the remainder. Big block manager 138 may then update or reduce the size of the free block in free block information 142 from its original size to the size of the remainder. Big block manager 138 may also resize the corresponding metadata for the free bock in big block information 140 as well.

In an embodiment, big block manager 138 (of big block allocator 124) may optimize how the free block is split in circumstances when the split creates two uneven blocks (e.g., because the requested block size is not equal to half the free block size). Big block manger 138 may perform such optimization by determining which portion of the free block remains free and which portion is allocated. In an embodiment, big block allocator 124 may decide how the split of a free block based on the arrangement and/or use of one or more memory blocks (which may be consistent with the deallocation process discussed in greater detail below).

At 240, in the big block info 140 list, a new block of the requested size may be inserted. For example, a new allocated block may be inserted into the big bock information 140 of the requested size and the 'isUsed' flag is set. And the previous free block is resized in both free block information 142 and big block information 140 as the remainder. In 245, the new block is then returned as the persistent pointer for the requesting program, system, or process.

At 215, if big block manager 138 determines that there are no existing free memory blocks that are bigger than or equal to the requested block size, then at 218, big block allocator 124 may request additional memory. In an embodiment, big block allocator 124 may request an additional file or memory segment from transient segment manager 114. In an embodiment, the allocated segment size for big block allocator 124 may be 128 MB. With a maximum block allocation size of 16 MB, this may ensure that the allocated segment may be used for multiple allocations by big block allocator 124. In other embodiments, the size of segments may vary.

In an embodiment, because the newly allocated segment is already known to be larger than the maximum requested block size, processing may continue to step 235 where the segment memory block is split as described above.

In an embodiment, if transient segment manager 114 is unable to allocate any more memory to big block allocator 124 (e.g., because there are no more available remaining memory segments), then a defragmentation process may be performed to return free blocks to the file system, which then can be used to create new segments. In another embodiment, defragmentation may be performed when the available remaining memory (or number of segments) falls below a specified threshold.

Figure 3:
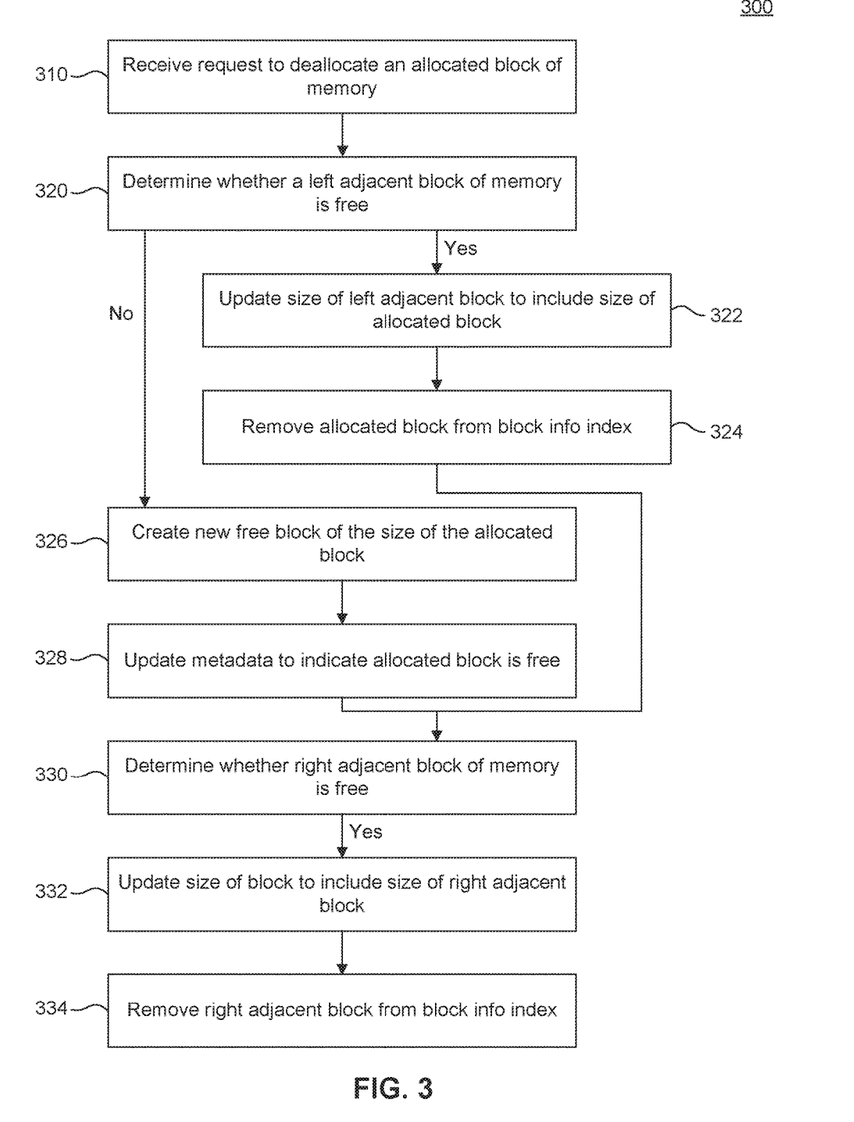
FIG. 3 is a flowchart illustrating a process for deallocation by the big block allocator, according to some example embodiments.

FIG. 3 is a flowchart illustrating a process 300 for deallocation by the big block allocator, according to some example embodiments. Process 300 can be performed by processing logic that can comprise hardware (e.g., circuitry, dedicated logic, programmable logic, microcode, etc.), software (e.g., instructions run on a processing device), or a combination thereof.

At 310, a request to deallocate a block of memory is received. For example, big block allocator 124 may receive a request to deallocate one or more blocks 118 of persistent main memory 110 which may have been previously allocated to a program or process operating on CPU 104. In an embodiment, this may occur when the program is uninstalled from CPU 104.

At 320, it is determined whether a left adjacent block of memory is free. For example, big block manager 138 may determine, from big block information 140, whether a left adjacent memory block (adjacent to block to be deallocated) is free. If the left adjacent block is free, then big block manager 138 may update/increase the size of the left adjacent block to include the size of the block to be deallocated in free block information 142 and big block information 140. This merging of two free blocks together (as described at 320 and 330) may increase the available size of remaining free blocks 118 in a segment 118 that could be made available to future or concurrent allocation requests. This may also prevent the need for more frequent defragmentation processing to occur, which may consume additional time, processing power, computing cycles, and other resources. At 324, the allocated block (to be deallocated) may then be removed from big block information 140.

If however, the left adjacent block is not free, then at 326 a new free block is created in free block information 142 corresponding to a size of the allocated block. At 328, big block manager may update the metadata of big block information 140 to reset the 'isUsed' flag to 0/false to indicate that the block is now free.

Processing then continue from step 324 or 328 to step 330. At 330, big block manager 138 determines whether the right adjacent block of memory is free. This may be determined from big block information 140. If the answer is no, then the deallocation process has completed. If however, the answer is yes, then processing continues to steps 332 and 334 in which the deallocated block is merged with the right adjacent block.

At 332, the size of the deallocated block is increased to include the size of the right adjacent block in both free block information 142 and big block information 140. At 334, the right adjacent block is then removed from both free block information 142 and big block information 140, and the deallocation process is completed.

Figure 4:
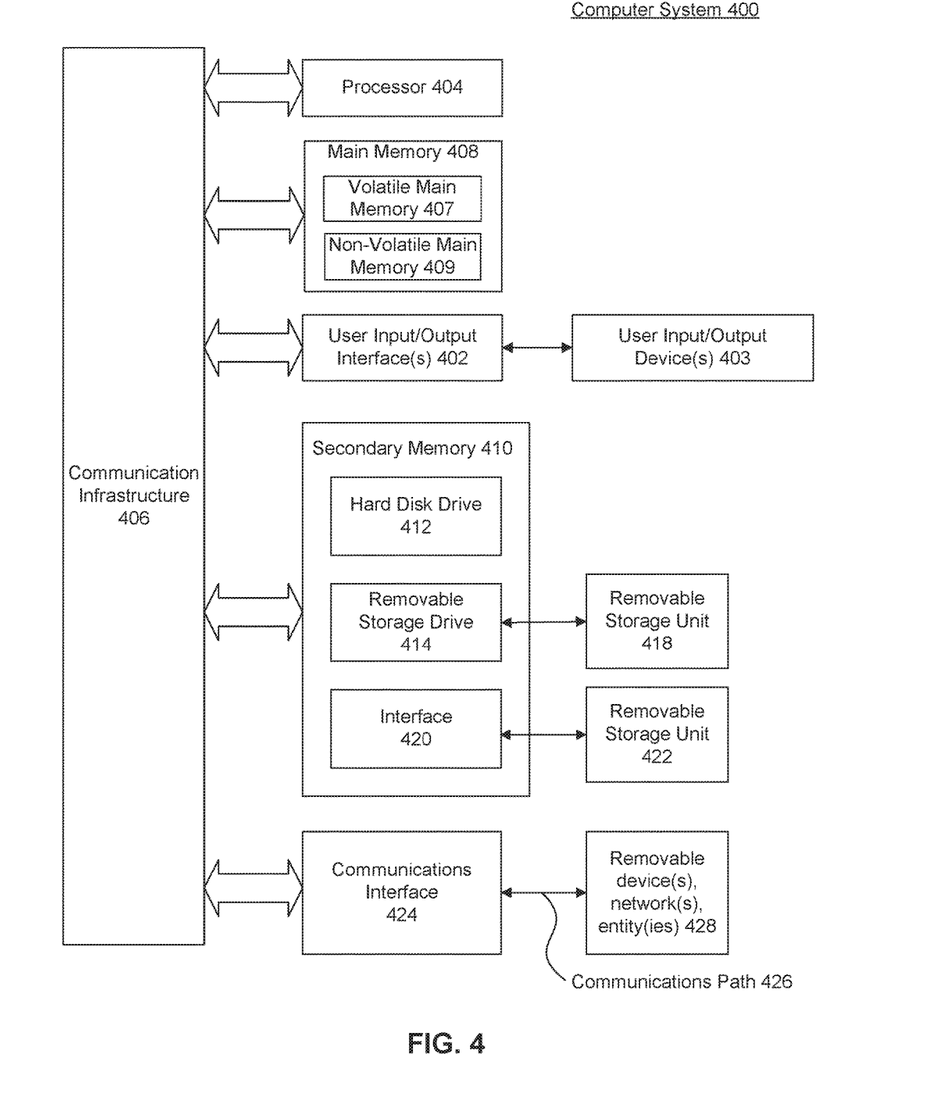
FIG. 4 is an example computer system 400 useful for implementing various embodiments.

FIG. 4 is an example computer system 400 useful for implementing various embodiments. Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data. In an embodiment, main memory 408 may include both volatile memory 407 and non-volatile memory 409. Non-volatile memory 409 may correspond to persistent memory 110 described herein. Volatile memory 407 may include any memory or storage that resets or does not persist on a power cycle of computer system 400.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   receiving an allocation request for memory of a requested size;
   determining, based on a free block index that indicates a size of one or more remaining free memory blocks, that the size of a particular one of the remaining free memory blocks exceeds the requested size and is available for allocation, wherein the particular free memory block exceeds the request size by a remainder size;
   updating, in both the free block index and a block information index that indicates which memory blocks have been allocated, the size of the particular free memory block to indicate that the size of the particular free memory block is equal to the remainder size;
   inserting, into the block information index, a new block of the requested size, wherein metadata corresponding to the new block indicates that the new block is allocated, and wherein the free block index does not include the new block;
   determining a memory address corresponding to the new block; and
   returning the memory address as a persistent pointer to the new block.

2. The method of claim 1, wherein the determining that the size of the particular one of the remaining free memory blocks exceeds the requested size is available comprises:
   determining, based on the free block index, that there is no available free memory block of at least the requested size;
   requesting a new file segment with additional memory for allocation; and
   determining that the new file segment includes the free memory block of greater than the requested size.

3. The method of claim 2, further comprising:
   inserting the new file segment into both the free block index and the block information index as a memory block.

4. The method of claim 1, wherein the free block index includes metadata, including the size and address, corresponding to the remaining free memory blocks available for allocation.

5. The method of claim 4, wherein the block information index includes metadata corresponding to both allocated blocks of memory and the remaining free memory blocks of the free block index, and wherein the metadata of the block information index includes an indication as to whether or not a respective memory block is allocated.

6. The method of claim 1, wherein the request is associated with a program, wherein the new block is allocated for use by the program, and wherein upon a restart of the program new block remains allocated for use by the program.

7. The method of claim 1, wherein the determining that the size of the particular one of the remaining free memory blocks exceeds the requested size is available comprises:
   determining, based on the free block index, that there is no available free memory block of at least the requested size;
   requesting a new file segment with additional memory for allocation;
   determining that there is no new file segment available;
   requesting a defragmentation; and
   receiving, after the defragmentation; the free memory block of at least the requested size.

8. A system, comprising:
   a memory; and
   at least one processor coupled to the memory and configured to:
     receive an allocation request for memory of a requested size;
     determine, based on a free block index that indicates a size of one or more remaining free memory blocks, that the size of a particular one of the remaining free memory blocks exceeds the requested size and is available for allocation, wherein the particular free memory block exceeds the request size by a remainder size;
     update, in both the free block index and a block information index that indicates which memory blocks have been allocated, the size of the particular free memory block to indicate that the size of the particular free memory block is equal to the remainder size;
     insert, into the block information index, a new block of the requested size, wherein metadata corresponding to the new block indicates that the new block is allocated, and wherein the free block index does not include the new block;
     determine a memory address corresponding to the new block; and
     return the memory address as a persistent pointer to the new block.

9. The system of claim 8, wherein the processor that determines that a free memory block exceeding the requested size is available is further configured to:
   determine, based on the free block index, that there is no available free memory block of at least the requested size;

request a new file segment with additional memory for allocation; and determine that the new file segment includes the free memory block of greater than the requested size.

10. The system of claim 9, wherein the processor is further configured to:

insert the new file segment into both the free block index and the block information index as a memory block.

11. The system of claim 8, wherein the free block index includes metadata, including the size and address, corresponding to the remaining free memory blocks available for allocation.

12. The system of claim 11, wherein the block information index includes metadata corresponding to both allocated blocks of memory and the remaining free memory blocks of the free block index, and wherein the metadata of the block information index includes an indication as to whether or not a respective memory block is allocated.

13. The system of claim 8, wherein the request is associated with a program, wherein the new block is allocated for use by the program, and wherein upon a restart of the program new block remains allocated for use by the program.

14. The system of claim 8, where the processor that determines that a free memory block exceeding the requested size is available is further configured to:

determining, based on the free block index, that there is no available free memory block of at least the requested size;

requesting a new file segment with additional memory for allocation;

determining that there is no new file segment available;

requesting a defragmentation; and receiving, after the defragmentation; the free memory block of at least the requested size.

15. A non-transitory computer-readable device having instructions stored thereon that, when executed by at least one computing device, causes the at least one computing device to perform operations comprising:

receiving an allocation request for memory of a requested size;

determining, based on a free block index that indicates a size of one or more remaining free memory blocks, that the size of a particular one of the remaining free memory blocks exceeds the requested size and is available for allocation, wherein the particular free memory block exceeds the request size by a remainder size;

updating, in both the free block index and a block information index that indicates which memory blocks have been allocated, the size of the particular free memory block to indicate that the size of the particular free memory block is equal to the remainder size;

inserting, into the block information index, a new block of the requested size, wherein metadata corresponding to the new block indicates that the new block is allocated, and wherein the free block index does not include the new block;

determining a memory address corresponding to the new block; and returning the memory address as a persistent pointer to the new block.

16. The device of claim 15, wherein the determining that the size of the particular one of the remaining free memory blocks exceeds the requested size is available comprises:

determining, based on the free block index, that there is no available free memory block of at least the requested size;

requesting a new file segment with additional memory for allocation; and determining that the new file segment includes the free memory block of greater than the requested size.

17. The device of claim 15, wherein the free block index includes metadata, including the size and address, corresponding to the remaining free memory blocks available for allocation.

18. The device of claim 17, wherein the block information index includes metadata corresponding to both allocated blocks of memory and the remaining free memory blocks of the free block index, and wherein the metadata of the block information index includes an indication as to whether or not a respective memory block is allocated.

19. The device of claim 15, wherein the request is associated with a program, wherein the new block is allocated for use by the program, and wherein upon a restart of the program new block remains allocated for use by the program.

20. The device of claim 15, wherein the wherein the determining that the size of the particular one of the remaining free memory blocks exceeds the requested size is available comprises:

determining, based on the free block index, that there is no available free memory block of at least the requested size;

requesting a new file segment with additional memory for allocation;

determining that there is no new file segment available;

requesting a defragmentation; and receiving, after the defragmentation; the free memory block of at least the requested size.

* * * * *